US009094945B2

United States Patent
Wan et al.

(10) Patent No.: US 9,094,945 B2
(45) Date of Patent: *Jul. 28, 2015

(54) DATA SENDING METHOD, DEVICE AND SYSTEM

(71) Applicant: Huawei Device Co., Ltd., Shenzhen, Guangdong (CN)

(72) Inventors: Jiang Wan, Shanghai (CN); Yu Deng, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 83 days.

This patent is subject to a terminal disclaimer.

(21) Appl. No.: 13/719,837

(22) Filed: Dec. 19, 2012

(65) Prior Publication Data

US 2013/0343268 A1   Dec. 26, 2013

Related U.S. Application Data

(63) Continuation of application No. PCT/CN2012/077369, filed on Jun. 21, 2012.

(51) Int. Cl.
| | |
|---|---|
| *G08C 17/00* | (2006.01) |
| *H04W 76/02* | (2009.01) |
| *H04W 52/02* | (2009.01) |

(52) U.S. Cl.
CPC .......... *H04W 76/02* (2013.01); *H04W 52/0251* (2013.01); *H04W 52/0274* (2013.01)

(58) Field of Classification Search
CPC ............ H04W 28/0221; H04W 52/02; H04W 52/0209; H04W 52/0225; H04W 52/0235; H04W 52/0241; H04W 76/02
USPC .......................................... 370/311, 328–338
See application file for complete search history.

(56) References Cited

U.S. PATENT DOCUMENTS

| | | |
|---|---|---|
| 2006/0088008 A1 | 4/2006 | Kim |
| 2007/0041342 A1* | 2/2007 | Usuda et al. ................... 370/329 |

(Continued)

FOREIGN PATENT DOCUMENTS

| | | |
|---|---|---|
| CN | 1913392 A | 2/2007 |
| CN | 101286784 A | 10/2008 |

(Continued)

OTHER PUBLICATIONS

Foreign Communication From a Counterpart Application, PCT Application PCT/CN2012/077369, Chinese Search Report dated Mar. 28, 2013, 6 pages.

(Continued)

*Primary Examiner* — Kan Yuen
(74) *Attorney, Agent, or Firm* — Conely Rose, P.C.; Grant Rodolph; Nicholas K. Beaulieu

(57) ABSTRACT

The present invention discloses a data sending method, device and system. The data sending method includes: before establishing a connection with a wireless network side, detecting whether a wireless terminal has data to be sent to the wireless network side, the data to be sent including signaling data for establishing the connection between the wireless terminal and the wireless network side; if a result of detecting whether the wireless terminal has data to be sent to the wireless network side is that the wireless terminal does not have data to be sent, making sure that a power amplifier (PA) of the wireless terminal is in a non-working state; if a result of detecting whether the wireless terminal has data to be sent to the wireless network side is that the wireless terminal has data to be sent, making sure that a PA of the wireless terminal is in a working state.

9 Claims, 5 Drawing Sheets

(56) References Cited

U.S. PATENT DOCUMENTS

| | | |
|---|---|---|
| 2007/0142081 A1 | 6/2007 | Lindqvist et al. |
| 2007/0287476 A1* | 12/2007 | Jeong et al. ............... 455/456.6 |
| 2008/0123791 A1* | 5/2008 | Majima ...................... 375/357 |
| 2010/0128645 A1* | 5/2010 | Lin et al. ................... 370/311 |
| 2010/0246424 A1* | 9/2010 | Tsuzuki ...................... 370/252 |
| 2012/0044845 A1 | 2/2012 | Lee et al. |
| 2013/0016632 A1* | 1/2013 | Mujtaba et al. ............. 370/275 |
| 2014/0185456 A1* | 7/2014 | YU et al. .................... 370/241 |

FOREIGN PATENT DOCUMENTS

| | | |
|---|---|---|
| CN | 101331742 A | 12/2008 |
| CN | 101483281 A | 7/2009 |
| EP | 2487964 A1 | 8/2012 |
| WO | 2011050717 A1 | 5/2011 |
| WO | 2012120085 A1 | 9/2012 |

OTHER PUBLICATIONS

Foreign Communication From a Counterpart Application, PCT Application PCT/CN2012/077369, Chinese Written Opinion dated Mar. 28, 2013, 5 pages.

Foreign Communication From a Counterpart Application, Japanese Application No. 2014-520509, Japanese Office Action dated Jul. 8, 2014, 2 pages.

Foreign Communication From a Counterpart Application, Japanese Application No. 2014-520509, English Translations of Japanese Office Action dated Jul. 8, 2014, 2 pages.

Foreign Communication From a Counterpart Application, European Application No. 12798130.6, Extended European Search Report dated Nov. 27, 2014, 6 pages.

* cited by examiner

DATA SENDING METHOD, DEVICE AND SYSTEM

CROSS-REFERENCE TO RELATED APPLICATION

This application is a continuation of International Application No. PCT/CN2012/077369, filed on Jun. 21, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of wireless communications, and in particular, to a data sending method, device and system.

BACKGROUND

Currently, in the procedure of a wireless terminal implementing data transmission, after establishing a communication link with a wireless network, the wireless terminal enters a dedicated channel (DCH) state, and in this state, the wireless network provides a dedicated communication link used for a user of a wireless terminal equipment to send and receive data. In order to ensure that communication data may be interacted with normally, after the user sends data to the wireless network side, the wireless terminal keeps an uplink (e.g., in a direction from the wireless terminal equipment to the wireless network side) power amplifier (PA) thereof in an ON state for a relatively long period of time. The PA may amplify power of data sent from the wireless terminal to the wireless network side. In this period of time, to ensure the quality of the link, the terminal equipment will send test report data at intervals, and the PA is turned off till the using of the DCH link expires. The expiration time is generally determined by the network and is generally 10 to 60 seconds (s) according to different models, required multiplexing methods and capacity configuration of wireless networks, and in this period of time, a conventional wireless terminal equipment turns on the PA thereof no matter whether there is data to be sent. However, from the perspective of actual use, when most terminal users use the equipment, traffic of downlink services received is far more than traffic of uplink services, so the PA being turned on for a long period of time is no doubt a waste of electricity of the wireless terminal equipment.

SUMMARY

Embodiments of the present invention provide a data sending method, device and system, which are capable of reducing electricity consumption of a wireless terminal equipment.

According to the foregoing objective, technical solutions of the embodiments of the present invention are implemented as follows:

A data sending method includes: before establishing a connection with a wireless network side, detecting whether a wireless terminal has data to be sent to the wireless network side, the data to be sent includes signaling data for establishing the connection between the wireless terminal and the wireless network side; if a result of detecting whether the wireless terminal has data to be sent to the wireless network side is that the wireless terminal does not have data to be sent, making sure that a PA of the wireless terminal is in a non-working state; if a result of detecting whether the wireless terminal has data to be sent to the wireless network side is that the wireless terminal has data to be sent, making sure that a PA of the wireless terminal is in a working state.

A wireless terminal includes a baseband chip and a PA. The baseband chip is configured to, before a connection with a wireless network side is established, detect whether the baseband chip has data to be sent to the wireless network side, the data to be sent includes signaling data for establishing the connection between the wireless terminal and the wireless network side; if a result of the detection is that the baseband chip does not have data to be sent, send, to the PA, a first message of making sure that the PA is in a non-working state; if a result of the detection is that the baseband chip has data to be sent, send, to the PA, a second message of making sure that the PA is in a working state. The PA is configured to receive the first message sent by the baseband chip and make sure that the PA is in the non-working state according to the first message; or receive the second message sent by the baseband chip and make sure that the PA is in the working state according to the second message.

A data sending device includes: a first unit configured to, before a connection with a wireless network side is established, detect whether a wireless terminal has data to be sent to the wireless network side, the data to be sent includes signaling data for establishing the connection between the wireless terminal and the wireless network side; a second unit configured to, if a result of detecting whether the wireless terminal has data to be sent to the wireless network side is that the wireless terminal does not have data to be sent, make sure that a PA of the wireless terminal is in a non-working state; and a third unit configured to, if a result of detecting whether the wireless terminal has data to be sent to the wireless network side is that the wireless terminal has data to be sent, make sure that the PA of the wireless terminal is in a working state, so that the PA amplifies the data to be sent and sends the amplified data to be sent to the wireless network side.

A data sending system includes a wireless network side equipment and a wireless terminal in a communication connection with the wireless network side equipment.

A data sending system includes a wireless network side equipment and a data sending device in a communication connection with the wireless network side equipment.

A computer readable storage medium is characterized in that, a computer stores a computer program code, and when the computer program code is executed by a computer, the computer program code may enable the computer to execute any step in the data sending method.

A computer program product is characterized in that, the computer program product includes a computer program code, and when the computer program code is executed by a computer, the computer program code may enable the computer to execute any step in the data sending method.

It can be seen from the foregoing solutions that, in the data sending method, device and system provided in the embodiments of the present invention, when it is determined that the wireless terminal does not have data to be sent, it ensures that the PA of the wireless terminal is in the non-working state, and the PA is not always working, so that the power consumption of the PA of the wireless terminal is saved, thereby reducing the electricity consumption of the wireless terminal equipment.

DETAILED DESCRIPTION

To make the objectives, technical solutions, and advantages of the present invention more comprehensible, the following describes the embodiments of the present invention in detail with reference to the accompanying drawings.

Figure 1:
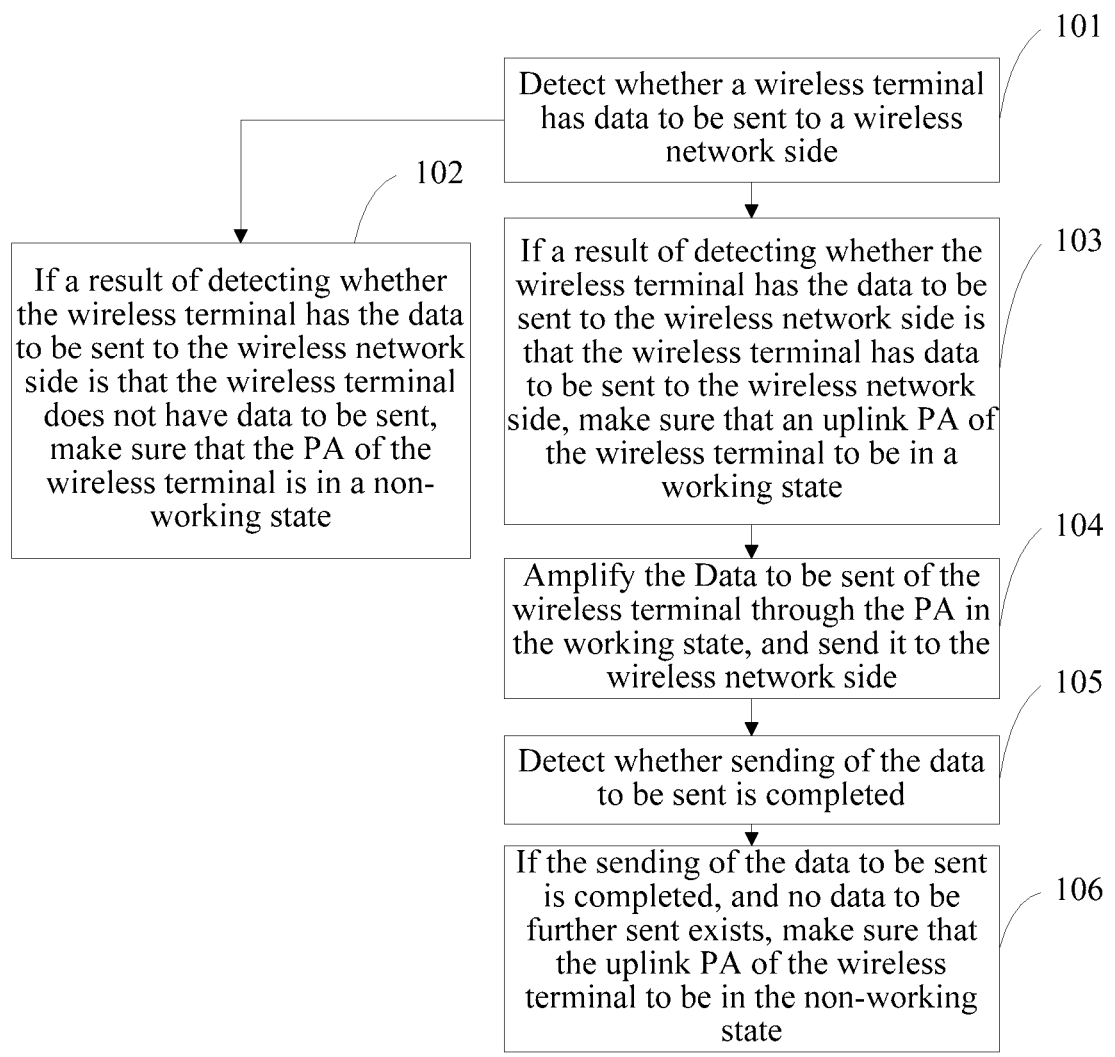
FIG. 1 is an outline flow chart of a data sending method in a first embodiment of the present invention.

A first embodiment of the present invention provides a data sending method, as shown in an outline flow chart of FIG. 1, which includes the following steps:

Step 101: Detect whether a wireless terminal has data to be sent to a wireless network side, the data including signaling data or user data.

Step 102: If a result of detecting whether the wireless terminal has data to be sent to the wireless network side is that the wireless terminal does not have data to be sent to the wireless network side, make sure that an uplink PA of the wireless terminal is in a non-working state.

The "make sure" involved in the text refers to guarantee. If the PA has been in a working state, keep the PA in the working state; and if the PA is not in the working state, make the PA to be in the working state.

Step 103: If the result of detecting whether the wireless terminal has data to be sent to the wireless network side is that the wireless terminal has data to be sent, make sure that the PA of the wireless terminal is in a working state.

The sequence of the step 102 and the step 103 may be exchanged, which does not influence the specific implementation of the embodiment of the present invention.

According to the foregoing data sending method, ON or OFF of the PA may be controlled according to whether the wireless terminal has data to be sent. The PA is turned off after the data is sent or when no data to be sent to the wireless network side exists, so uplink power consumption of the wireless terminal can be reduced, and energy saving of the wireless terminal is implemented when the wireless terminal does not need to interact with the wireless network side.

After the step 103, the foregoing method may further include at least one of the following steps:

Step 104: Amplify the data to be sent of the wireless terminal through the PA in the working state and send the amplified data to be sent to the wireless network side.

Step 105: Detect whether sending of the amplified data to be sent is completed.

Step 106: If the sending is completed, make sure that the PA of the wireless terminal is in the non-working state. The non-working state here may include a sleep working mode and a power-off working mode.

The detecting whether the wireless terminal has data to be sent to the wireless network side may be implemented by one of the following three detection methods:

First method: A baseband chip of the wireless terminal detects whether at least one wireless frame exists in a first storage that is located in the wireless terminal and is connected to the baseband chip of the wireless terminal. If the result of detecting whether the wireless terminal has data to be sent to the wireless network side is that the wireless terminal does not have data to be sent includes that, no wireless frame exists in the first storage. If the result of detecting whether the wireless terminal has data to be sent to the wireless network side is that the wireless terminal has data to be sent includes that, at least one wireless frame exists in the first storage. If no wireless frame exists in the first storage, the baseband chip has no data to be sent. If at least one wireless frame exists in the first storage, the baseband chip has data to be sent. The at least one wireless frame is received by the baseband chip from an application processor (AP) of the wireless terminal and is then stored in the first storage.

Second method: Detecting, by a baseband chip of the wireless terminal, whether the wireless terminal has data to be sent to the wireless network side may include: detecting whether data to be sent exists on a Layer 1 of the baseband chip of the wireless terminal. Detecting whether data to be sent exists on the Layer 1 of the baseband chip of the wireless terminal may specifically include detecting whether a coder of the baseband chip has data to be sent. If the coder of the baseband chip has data to be sent (e.g., data of at least one wireless frame exists), the baseband chip has that data to be sent. If the coder of the baseband chip does not have data to be sent, the baseband chip has no data to be sent.

Third method: A baseband chip of the wireless terminal detects whether data to be sent exists on a Layer 3 of the baseband chip of the wireless terminal. Specifically, whether data to be sent exists on a packet data convergence protocol (PDCP) sub-layer of the Layer 3 may be detected. If the wireless terminal has data to be sent, before making sure that the PA of the wireless terminal is in the working state, the method may further include: storing, by the Layer 3, the data to be sent in a second storage in the wireless terminal. After making sure that the PA of the wireless terminal is in the working state, and before amplifying the data to be sent of the wireless terminal through the PA in the working state and sending the amplified data to be sent to the wireless network side, the method may further include: reading, by a Layer 1 of the baseband chip of the wireless terminal, the data to be sent from the second storage. The second storage may be located in the baseband chip and may also be located in the wireless terminal and connected to the baseband chip. The Layer 1 may read the data to be sent from the first storage at predetermined periods of time. Preferably, a predetermined period of time may be 10 milliseconds (ms).

The detecting whether the wireless terminal has data to be sent to the wireless network side further includes: detecting, by the baseband chip of the wireless terminal, whether data exists in the second storage, where the second storage is located in the wireless terminal and is connected to the baseband chip of the wireless terminal or located in the baseband chip.

The result of detecting whether the wireless terminal has data to be sent to the wireless network side being that the wireless terminal does not have data to be sent includes that the data does not exist in the second storage.

The result of detecting whether the wireless terminal has the data to be sent to the wireless network side being that the wireless terminal has data to be sent includes that the data exists in the second storage, where the data is a part or all of the at least one wireless frame.

Here, protocol layering of an air interface of 3GPP is introduced simply. The protocol layering of the air interface of 3rd Generation Partnership Project (3GPP) includes a network application layer, that is, a top layer, a Layer 3, marked as L3, includes various messages and programs, and performs control and management of a service. A Layer 2 and a Layer 1 are sequentially located below the Layer 3 in the protocol layering of the air interface. The Layer 2 is a data link layer, marked as L2, and is an intermediate layer. The L2 includes various data transmission structures, performs control on data transmission, and ensures that a reliable dedicated data link is established between a mobile station and a base station. The Layer 1 is a physical layer, marked as L1, and is a bottom layer providing a wireless link required by transferring a bit stream. The L1, L2, and L3 are all 3 independent 3GPP protocol layers in the wireless terminal.

In the step 102, after making sure that the PA of the wireless terminal is in the working state, the method may further include: notifying, by the Layer 1 of the baseband chip of the wireless terminal, the Layer 3 of a message of successfully making sure that the PA of the wireless terminal is in the working state.

The notifying, by the Layer 1 of the baseband chip of the wireless terminal, the Layer 3 of the message of successfully making sure that the PA of the wireless terminal is in the working state may include: determining, by the Layer 1 of the baseband chip of the wireless terminal, that a state of a first flag bit is corresponding to that the PA is in the working state, so that the Layer 3 reads the determined first flag bit, where the first flag bit is used to indicate whether the PA of the wireless terminal is in the working state. The first flag bit may be an identifier (e.g., a bit of Boolean variable, which has a value of 1 after being set, indicating that the PA is in the working state; and has a value of 0 when not being set, indicating that the PA is not turned on successfully) and may be marked as F1. For the first flag bit, reference may be made to the description of the first flag bit in step 209.

In step 106, after the sending of the data to be sent is completed, the method may include: notifying, by the Layer 1 of the baseband chip of the wireless terminal, the Layer 3 of a message indicating that the sending of the data to be sent is completed. The Layer 3 may control to turn off the PA according to the message indicating that the sending of the data to be sent is completed.

The notifying, by the Layer 1 of the baseband chip of the wireless terminal, the Layer 3 of the message indicating that the sending of the data to be sent is completed may include: determining, by the Layer 1 of the baseband chip of the wireless terminal, that a state of a second flag bit is corresponding to that the sending of the data to be sent is completed, so that the Layer 3 reads the determined second flag bit, where the second flag bit is used to indicate whether the sending of the data to be sent is completed. The second flag bit may be an identifier (e.g., a bit of Boolean variable, which has a value of 1 after being set, indicating that the sending of the data to be sent is completed; and has a value of 0 when not being set, indicating that the sending of the data to be sent is not completed) and may be marked as F2. For the second flag bit F2, reference may be specifically made to the description of the second flag bit in step 215 of a second embodiment, and details are not repeated herein.

The reading, by the Layer 3, the determined first flag bit may include: reading, by the Layer 3, the determined first flag bit at predetermined periods of time.

The reading, by the Layer 3, the determined second flag bit may include: reading, by the Layer 3, the determined second flag at predetermined periods of time.

A predetermined period of time may be 10 ms.

In the steps 103 and 106, the making sure that the PA of the wireless terminal is in the non-working state may include: sending, by the baseband chip of the wireless terminal, a first command to a serial peripheral interface (SPI) of the PA through an SPI bus, where the first command controls the PA to be in a sleep state. When the PA is in the sleep state, the PA only consumes a little electricity compared with the PA in the working state, so as to save a large amount of electrical energy compared with the PA in the working state.

In the steps 103 and 106, the making sure that the PA of the wireless terminal is in the non-working state may include: sending, by the baseband chip of the wireless terminal, a second command to a digital Radio Frequency (digRF) interface of the PA through a digRF bus, where the second command controls the PA to be in the sleep state.

In the steps 103 and 106, the making sure that the PA of the wireless terminal is in the non-working state may include: sending, by the baseband chip of the wireless terminal, a third command to an enable interface (EN) of the PA, where the third command controls the PA to be in the sleep state.

In the steps 103 and 106, the making sure that the PA of the wireless terminal is in the non-working state may include: stopping, by a power supplier of the wireless terminal, power supply for the PA, so that the PA is power-off. Specifically, a direct current to direct current (DC/DC) converter may be connected in series between the power supplier and the PA, and the DC/DC converter is controlled through the baseband chip, so as to control whether the power supplier supplies power to the PA. When the power supplier does not supply power to the PA, the PA is power-off. The controlling the DC/DC converter through the baseband chip belongs to the prior art and is not repeated herein.

In the step 105, detecting whether the sending of the data to be sent is completed includes: detecting whether 20 milliseconds pass from the moment when it is detected that the wireless terminal has data to be sent. The data to be sent being sent includes: 20 milliseconds pass from the moment when it is detected that the wireless terminal has data to be sent.

Figure 2:
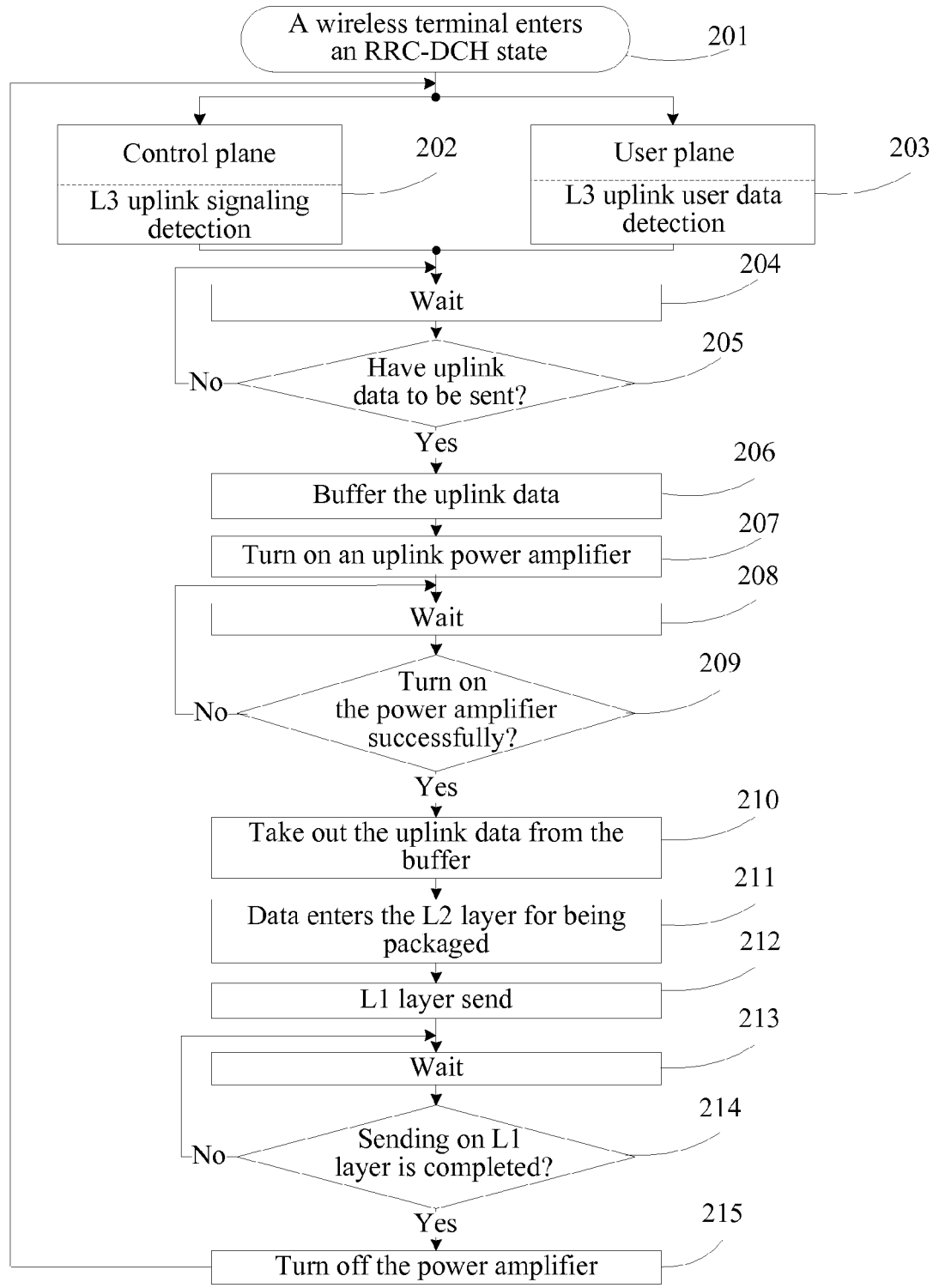
FIG. 2 is a detailed flow chart of a data sending method in a second embodiment of the present invention.

A second embodiment of the present invention provides a data sending method, as shown in the detailed flow chart of FIG. 2, which includes the following steps:

Step 201: A wireless terminal enters a radio resource control-direct channel (RRC-DCH) state, that is, a DCH connection is connected between the wireless terminal and a network side.

Step 202: Detect uplink signaling data of a control plane on a Layer 3 of a baseband chip of the wireless terminal.

Step 203: Detect uplink user data of a user plane on the Layer 3 of the baseband chip of the wireless terminal.

The execution sequence of the steps 202 and 203 is not strictly limited, the step 202 may be executed first, or the step 203 may be executed first, or the steps 202 and 203 may be executed at the same time. For the detection methods in the steps 202 and 203, reference may be made to the first embodiment of the present invention in which the detecting whether the wireless terminal has data to be sent to the wireless network side may be performed by adopting one of the three detection methods, and details are not repeated herein.

Step 204: After the signaling data detection of the step 202 and the user data detection of the step 203, the wireless terminal waits for a period of time, so as to coordinate the signaling data and/or user data obtained in the foregoing steps 202 and 203. The waiting time may be preferably 5 ms.

Step 205: The L3 of the wireless terminal detects whether the L3 has uplink data to be sent. The uplink data may include the signaling data and/or user data obtained in the steps 202 and 203. When a detection result is that no uplink data exists, the wireless terminal returns to the step 204 to continue waiting. If the detection result is that uplink data exists, proceed to step 206.

Step 206: When the L3 of the wireless terminal detects the uplink data, buffer the uplink data in a second storage of the wireless terminal. Preferably, the second storage may be located on the L3 of the baseband chip. Of course, the storage may also be located on the L2 or L1 of the wireless terminal, as long as data access on any layer from L3 to L1 is convenient. Optionally, the second storage may also be located in the wireless terminal and be connected to the baseband chip. The capacity of the second storage may be of any size as long as a part of the uplink data may be buffered, for example, the capacity of the second storage may be set as 1 kilobyte (KB). When the uplink data is stored, a first address and length of a buffer area of the uplink data may be recorded in the second storage. Different wireless terminals have different processing capabilities, so the uplink data may be sent to the wireless network side in real time when being generated. Therefore, the configuration of the second storage is optional. The step is also optional.

Step 207: After a part or all of the uplink data of the L3 is stored in the second storage, the L3 may actively inform the L1 that the L3 has uplink data required to be sent to the wireless network side. It is also possible that after the L1 actively learns that the L3 has uplink data required to be sent to the wireless network side, make sure that the baseband chip turns on the PA.

The L1 learning that the L3 has uplink data required to be sent to the wireless network side may be that, the second storage is checked at predetermined periods of time, and if data exists in the second storage, the data is the uplink data to be sent.

Step 208: The L1 waits for a period of time and makes sure that the turning on of the PA is completed. A conventional radio frequency PA may be turned on reliably within 5 ms, and therefore, a timer having the delay of 5 ms is set, and when timing ends, it is determined that the turning on of the PA is completed.

Step 209: The L1 determines whether the turning on of the PA is completed. Whether the turning on of the PA is completed may be determined by detecting an input/output port (I/O port) of the PA. For example, it may be preset that when the I/O port of the PA is at a high electrical level, the turning on of the corresponding PA is completed; and when the I/O port of the PA is at a low electrical level, the turning on of the corresponding PA is not completed. It may also be preset that when the I/O port of the PA is at the low electrical level, the turning on of the corresponding PA is completed; and when the I/O port of the PA is at the high electrical level, the turning on of the corresponding PA is not completed. The high electrical level may refer to a logic voltage higher than 1.5 volts (V), and the low electrical level may refer to a logic voltage lower than 0.3 V. The determination result may be presented by setting an identifier (e.g., a bit of Boolean variable, which has a value of 1 after being set, and has a value of 0 when not being set) in the wireless terminal (e.g., in the storage of the wireless terminal, and specifically in the first storage or the second storage), which is marked as a first flag bit F1, and the identifier F1 may be accessed by any layer of L3, L2 and L1.

The configuration of the F1 may avoid a data stream sent from the L3 to the L1 from performing the subsequent flow incorrectly when the PA is not ready, thereby ensuring the execution accuracy of the method in this embodiment. In this embodiment, it may be set that when the F1 is set, it indicates that the PA located on the L1 is in the working state; and when the F1 is not set, it indicates that the PA located on the L1 is not turned on successfully. Specifically, the F1 may be accessed by any layer of L1 to L3. After the L1 completes the turning on of the PA, the L1 sets the F1. The L3 performs reading after the setting by the L1, so as to learn that the turning on of the PA is completed, thereby performing uplink data transmission. The reading, by the L3, the determined first flag bit includes: reading, by the L3, the determined first flag bit at predetermined periods of time. A predetermined period of time may be 10 ms. Of course, when the wireless terminal has a strong real-time processing capability, the PA may be turned on in real time when it is confirmed that there is data to be sent, so this step is not necessary. If the turning on of the PA is completed, proceed to step 210. If the turning on of the PA is not completed, return to step 208 to continue waiting.

Step 210: After the turning on of the PA is completed, the L3 takes out the data to be uploaded from the second storage and prepares for sending the data to be uploaded. As described in the step 206, the data may be delivered from the L3 to the L1 in real time for being sent, so the configuration of the second storage is optional, and the taking out the data from the second storage in this step is optional.

Step 211: After taking out the data to be uploaded, the L3 sends the data to the L2 for packaging. That is, the L2 packages the data to be uploaded into a format suitable for being transmitted in a wireless channel, so as to send the data to be uploaded to the wireless network side.

Step 212: After the L2 sends the data to be uploaded to the L1, the L1 sends the data to be uploaded to the wireless network side.

Step 213: The wireless terminal waits for the L1 to transmit the data to be uploaded.

Step 214: The L1 determines whether sending of all data to be uploaded is completed. If the sending is not completed, return to step 213 to continue waiting for the completion of the sending of the data. If the sending is completed, proceed to step 215. The determining whether the sending of all the data to be uploaded is completed may include: detecting whether 20 ms pass from the moment when it is detected that the wireless terminal has data to be sent. The completion of sending of the data to be sent includes that 20 ms pass from the moment when it is detected that the wireless terminal has data to be sent. The time of 20 ms is obtained through delay determination. The length of one wireless frame is 10 ms, so twice redundancy, that is, 20 ms, may be set from the moment when a baseband chip detects that the wireless terminal has data to be sent to the moment when the sending of the wireless frame is completed, and it is considered that the sending of one wireless frame is completed after 20 ms.

Step 215: After the L1 completes sending, the L1 informs the L3 that the sending of the data is completed. The notification may specifically be presented by setting an identifier (e.g., a bit of Boolean variable, which has a value of 1 after being set, and has a value of 0 when not being set) in the wireless terminal (e.g., in the storage of the wireless terminal, and specifically in the first storage or the second storage), which is marked as a second flag bit F2, and the identifier F2 may be accessed by any layer of L3, L2 and L1. The configuration of the F2, in this embodiment, may be that, when the F2 is set, it indicates that the sending of the data to be sent is completed by the L1, and when the F2 is not set, it indicates that the data to be sent is not sent by the L1. Specifically, the F2 may be accessed by any layer from L1 to L3. After the L1 completes the turning off of the PA, the L1 sets the F2. The L3 performs reading after the setting by the L1, so as to learn that the sending of the uplink data is completed. When the L3 of the baseband chip learns that the sending of the uplink data is completed, the PA is controlled to be turned off.

The method in the embodiment of the present invention is on the basis of the method of the first embodiment, and the embodiment of the present invention adopts the method of setting the waiting time to ensure the completeness of data sending and the complete turning on of the PA. The PA is turned off after the data sending is completed or when no data to be sent to the wireless network side exists, so uplink power consumption of the wireless terminal may be reduced, and energy saving of the wireless terminal is implemented when the wireless terminal does not need to interact with the wireless network side.

Figure 3:
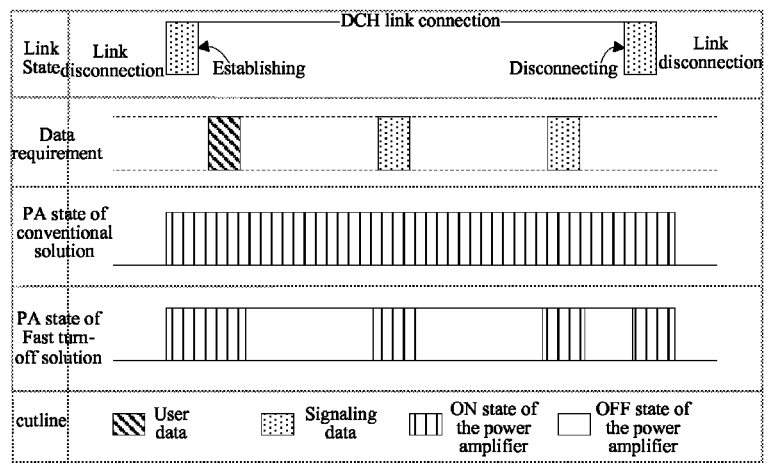
FIG. 3 is a comparison chart of an effect of a PA adopting a data sending method of an embodiment of the present invention and an effect of a PA adopting the prior art.

The specific effect of reducing power consumption by adopting the method according to the embodiment of the present invention is introduced through a specific example hereunder. As shown in FIG. 3, by taking an example that a user opens a web page on a wireless terminal through a wireless network, it can be seen from a link state in FIG. 3 (as shown by a first row of FIG. 3) that a protocol stack of the wireless terminal may send request signaling (as shown by a first dot-matrix grid at the first row of FIG. 3) for establishing a DCH link with a base station of a wireless network side. It is seen from data requirement that, user data (as shown by a diagonal grid at the second row of FIG. 3) is first sent to the wireless network, and a measurement report (a type of signaling data, as shown by the dot-matrix grid of the second row of the FIG. 3) is sent to the wireless network for each period of time, and after finding that the user has no data to send for a long time (e.g., the time is determined by a network side and is generally 10 to 60 s), the wireless network actively disconnects the link (as shown by a second dot-matrix grid at the first row of FIG. 3). It can be seen from the original solution of the prior art that, in the whole procedure from the establishment of a DCH link to the disconnection of the link, the PA is always in the ON state, that is, the PA keeps in the ON state even when no user data or signaling data exists, and after the data sending method of the embodiment of the present invention is adopted, a PA is turned on according to an actual data sending requirement, the PA is turned off immediately after the sending of uplink data is completed, thereby avoiding meaningless power consumption. In a data requirement at the second row of FIG. 3, after the user data and signaling data are corresponding to the OFF state of the PA at a fourth row, the turning off and on of the PA still need some delay, and the delay is safety delay for ensuring the complete turning off and on of the PA. Preferably, it can be set that a radio frequency PA is turned on reliably within 5 ms. Specifically, a timer having the delay of 5 ms may be set, and when the timing ends, it is determined that the turning on or off of the PA is completed.

Figure 4:
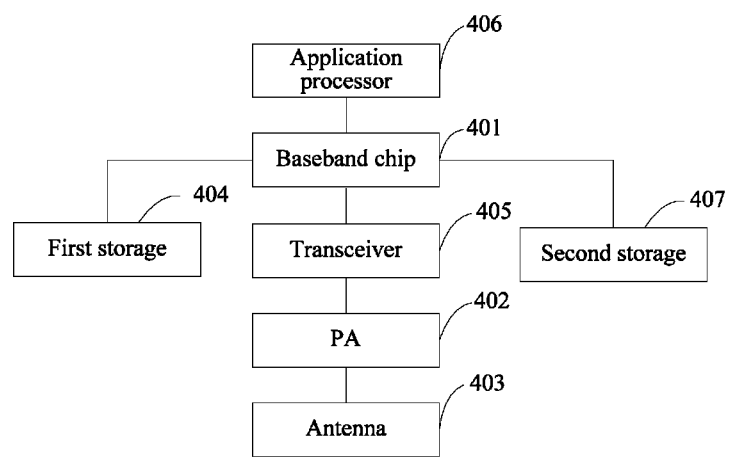
FIG. 4 is a schematic structural diagram of a wireless terminal in a third embodiment of the present invention.

A third embodiment of the present invention further provides a wireless terminal, as shown in FIG. 4, the wireless terminal includes the following components:

A baseband chip 401 configured to detect whether the baseband chip has data to be sent, the data to be sent including signaling data or user data; if a result of detection is that the baseband chip does not have data to be sent, send, to a PA, a first message of making sure that the PA is in a non-working state; if the result of detection is that the baseband chip has data to be sent, send, to a PA, a second message of making sure that the PA is in a working state.

A PA 402 configured to receive the first message sent by the baseband chip and make sure that the PA is in the non-working state according to the first message; or receive the second message sent by the baseband chip and make sure that the PA is in the working state according to the second message.

The wireless terminal in this embodiment may, according to whether data to be sent exists, control the turning on or off of the PA. The PA is turned on only when data is being sent, so the uplink power consumption of the wireless terminal can be reduced, and energy saving of the wireless terminal may be implemented when the wireless terminal does not need to interact with a wireless network side.

The wireless terminal in this embodiment may further include a transceiver 405 configured to receive the data to be sent from the baseband chip, modulate the data to be sent, and send first data after the modulation to the PA.

The PA 402 is further configured to amplify the first data after the modulation.

The wireless terminal of this embodiment may further include:

An antenna 403 configured to send second data amplified by the PA to the wireless network side.

The baseband chip 401 is further configured to detect whether sending of the data to be sent is completed; and if the sending of the data to be sent is completed, send, to the PA, the first message of making sure that the PA is in the non-working state.

The wireless terminal in this embodiment may further include an application processor (AP) 406 configured to generate the data to be sent and send the data to be sent to the baseband chip.

The baseband chip in this embodiment receives the data to be sent from the AP and stores at least one wireless frame in the data to be sent in a first storage 404; if the first storage does not have the data to be sent, a result corresponding to the detection is that the baseband chip does not have the data to be sent; and if the first storage has the at least one wireless frame in the data to be sent, the result corresponding to the detection is that the baseband chip has the data to be sent. The wireless terminal in this embodiment may further include the first storage 404 connected to the baseband chip and configured to store the at least one wireless frame in the data to be sent.

Further, the wireless terminal may further include a second storage 407 connected to the baseband chip 401 (as shown in FIG. 4) or located in the baseband chip (not shown), and configured to store the data. For the specific usage of the second storage, reference may be made to the introduction of the second storage in the first embodiment.

The baseband chip 401, when the first storage has the at least one wireless frame, stores, in the second storage, a part or all of the at least one wireless frame in the first storage; if the second storage does not have data, a result corresponding to the detection is that the baseband chip does not have data to be sent; if the second storage has data, the result corresponding to the detection is that the baseband chip has data to be sent; and the data is a part or all of the at least one wireless frame.

The baseband chip 401 is further configured to store the data to be sent in the second storage 407; and read the data to be sent from the second storage 407.

The baseband chip 401 is specifically configured to read the data to be sent from the second storage 407 at predetermined periods of time. Preferably, the foregoing predetermined period of time may be 10 ms.

The detecting, by the baseband chip 401, whether the wireless terminal has data to be sent may specifically be that, the baseband chip detects whether a coder of the baseband chip has the data to be sent; and the data to be sent is sent by the AP to the baseband chip.

The sending, by the baseband chip, the first message of making sure that the PA is in the non-working state to the PA may specifically be that, the baseband chip sends a first command to an SPI of the PA through an SPI bus, and the first command controls the PA to be in a sleep state.

The sending, by the baseband chip, the first message of making sure that the PA is in the non-working state to the PA may also specifically be that, the baseband chip sends a second command to a digRF interface of the PA through a digital radio frequency digRF bus, and the second command controls the PA to be in the sleep state.

The sending, by the baseband chip, the first message of making sure that the PA is in the non-working state to the PA may also specifically be that, the baseband chip sends a third command to an enable interface EN of the PA, and the third command controls the PA to be in the sleep state.

The sending, by the baseband chip, the first message of making sure that the PA is in the non-working state to the PA may also specifically be that, the baseband chip instructs a power supplier to stop supplying power for the PA, so that the PA is power-off.

As for the wireless terminal of the foregoing embodiment of the present invention, when it is determined that the first storage stores at least one wireless frame, the PA is turned on, the PA is turned off until the sending of the data to be sent is completed, and the data to be sent that is transmitted in the baseband chip is buffered by the second storage, thereby ensuring the completeness of uplink data transmission and the efficiency of uplink transmission.

Figure 5:
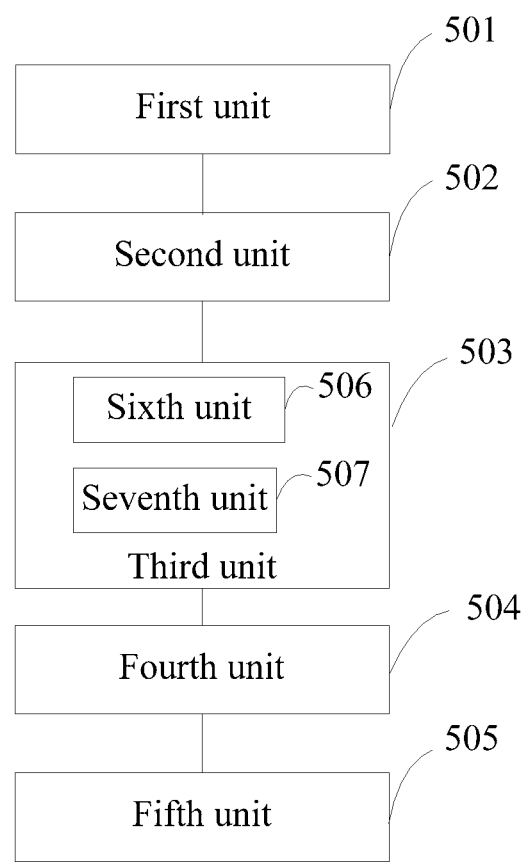
FIG. 5 is a schematic structural diagram of a data sending device in a fourth embodiment of the present invention.

A fourth embodiment of the present invention further provides a data sending device, as shown in FIG. 5, the data sending device includes:

A first unit 501 configured to detect whether a wireless terminal has data to be sent to a wireless network side, the data including signaling data or user data.

A second unit 502 configured to, when a result of detecting whether the wireless terminal has data to be sent to the wireless network side is that the wireless terminal does not have data to be sent, make sure that a power amplifier PA of the wireless terminal is in a non-working state.

A third unit 503 configured to, when the result of detecting whether the wireless terminal has data to be sent to the wireless network side is that the wireless terminal has data to be sent, make sure that the PA of the wireless terminal is in a working state, so that the PA amplifies the data to be sent and send the amplified data to be sent to the wireless network side.

The data sending device of this embodiment may further include:

A fourth unit 504 configured to detect whether sending of the data to be sent is completed.

A fifth unit 505 configured to, when the sending of the data to be sent is completed, make sure that the PA of the wireless terminal is in the non-working state.

The first unit may be specifically configured to: detect whether data to be sent exists on a Layer 3 of the baseband chip of the wireless terminal.

Further, the first unit may be specifically configured to: detect whether data to be sent exists on a packet data convergence protocol DPCP sub-layer of the Layer 3.

Alternatively, the first unit may be specifically configured to: detect whether data to be sent exists on a Layer 1 of the baseband chip of the wireless terminal.

Further, the first unit may be specifically configured to: detect whether data to be sent exists in a coder of the baseband chip.

Alternatively, the first unit may be specifically configured to: detect whether at least one wireless frame exists in a first storage that is located in the wireless terminal and is connected to the baseband chip of the wireless terminal; where if at least one wireless frame exists, the wireless terminal has data to be sent; and if no wireless frame exists, the wireless terminal does not have data to be sent. The at least one wireless frame is received by the baseband chip from an AP of the wireless terminal and then stored in the first storage.

The first unit is specifically configured to: detect whether data exists in a second storage located in the wireless terminal and connected to the baseband chip of the wireless terminal or located in the baseband chip; where if the data exists, the wireless terminal has data to be sent; and if the data does not exist, the wireless terminal does not have data to be sent, the data being a part or all of the at least one wireless frame.

The third unit may further include: a sixth unit 506 and a seventh unit 507. The seventh unit 507 is configured to notify the Layer 3 of a message of successfully making sure that the PA of the wireless terminal is in the working state.

The seventh unit is specifically configured to determine that a state of a first flag bit is corresponding to that PA is in the working state, so that the Layer 3 reads the first flag bit determined, and the first flag bit is used to indicate whether the PA of the wireless terminal is in the working state.

The fifth unit may specifically be configured to notify the Layer 3 of a message indicating that the sending of the data to be sent is completed, so that the Layer 3 confirms that the PA of the wireless terminal is in the non-working state.

The fifth unit may specifically be configured to determine that a state of a second flag bit is corresponding to that the sending of the data to be sent is completed, so that the Layer 3 reads the second flag bit determined, and the second flag bit is used to indicate whether the sending of the data to be sent is completed.

The second unit and the fifth unit each may be configured to send a first command to an SPI of the PA through an SPI bus, where the first command controls the PA to be in a sleep state.

Alternatively, the second unit and the fifth unit each may be configured to send a second command to a digRF interface of the PA through a digital radio frequency digRF bus, where the second command controls the PA to be in the sleep state.

Alternatively, the second unit and the fifth unit each may be configured to send a third command to an enable interface EN of the PA, where the third command controls the PA to be in the sleep state.

Alternatively, the second unit and the fifth unit each may be configured to stop supplying power for the PA, so that the PA is powered-off.

The fourth unit may be specifically configured to detect whether 20 ms pass from the moment when it is detected that the wireless terminal has data to be sent; and if 20 ms pass from the moment when it is detected that the wireless terminal has data to be sent, the sending of the data to be sent is completed.

As for the data sending device provided in the embodiment of the present invention, when it is determined that the first storage stores at least one wireless frame, the PA is turned on, the PA is turned off until the sending of the data to be sent is completed, and the data to be sent that is transmitted in the baseband chip is buffered by the second storage, thereby ensuring the completeness of uplink data transmission and the efficiency of uplink transmission.

Figure 6:
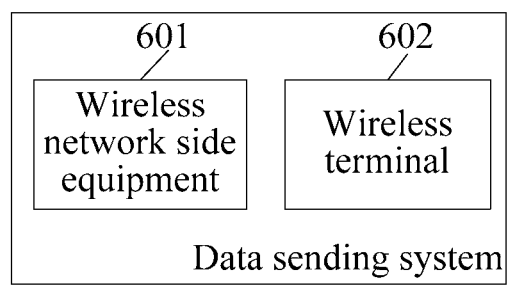
FIG. 6 is a schematic structural diagram of a data sending system in a fifth embodiment of the present invention.

A fifth embodiment of the present invention further provides a data sending system, as shown in FIG. 6, the data sending system includes a wireless terminal 602 and a wireless network side equipment 601 as described in the foregoing embodiments. The wireless terminal 602 is in a communication connection with the wireless network side equipment 601. The wireless network side equipment 601 may specifically be a base station equipment located in a wireless network side. Therefore, for the specific implementation of the wireless terminal, reference may be made to the implementation of the wireless terminal in the third embodiment, and details are not repeated herein.

Figure 7:
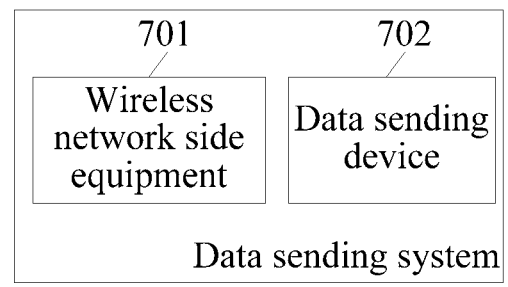
FIG. 7 is a schematic structural diagram of a data sending system in a sixth embodiment of the present invention.

A sixth embodiment of the present invention further provides a data sending system, as shown in FIG. 7, and the data sending system includes a data sending device 702 and a wireless network side equipment 701 as described in the foregoing embodiments. The data sending device 702 is in a communication connection with the wireless network side equipment 701. The wireless network side equipment 701 may specifically be a base station equipment located in a wireless network side. Therefore, for the specific implementation of the data sending device, reference may be made to the implementation of the data sending device in the fourth embodiment, and details are not repeated herein.

A seventh embodiment of the present invention further provides a data sending method. The difference between this embodiment and the foregoing first embodiment of the present invention lies in that, the step 101 is that: before establishing a connection with a wireless network side, detect whether a wireless terminal has data to be sent to the wireless network side, the data to be sent including signaling data for establishing a connection between the wireless terminal and the wireless network side.

Specifically, the signaling data for establishing the connection between the wireless terminal and the wireless network side may be request data sent by the wireless terminal to the wireless network side for establishing a DCH link connection. The request data is sent to the wireless network side through a random access channel (RACH).

Evidently, the data sending method of the seventh embodiment, as compared with the second embodiment, has the difference that the data to be sent to the wireless network side is sent before the connection with the wireless network side is established, instead of sending it after the wireless terminal enters the RRC-DCH state as shown in Embodiment 2.

The data sending method in the embodiment of the present invention focuses on, before the connection with the wireless network side is established, whether there is data to be sent to the wireless network side, that is, the request data for establishing the DCH link connection, which is corresponding to a link establish request at a first row of FIG. 3. If the foregoing link establish request exists, the baseband chip of the wireless terminal controls to turn on the PA, after the sending of the link establish request is completed, the baseband chip controls to turn off the PA, thereby effectively reducing the power consumption of the PA and the wireless terminal.

An eighth embodiment of the present invention further provides a wireless terminal, as compared with the third embodiment of the present invention, the difference lies in that the baseband chip 401 is configured to, before the connection with the wireless network side is established, detect whether the baseband chip has data to be sent to the wireless network side, the data to be sent including signaling data for establishing the connection between the wireless terminal and the wireless network side; if a result of detection is that the baseband chip does not have data to be sent, send, to the PA, a first message of making sure that the PA is in the non-working state; and if the result of detection is that the baseband chip has data to be sent, send to the PA a second message of making sure that the PA is in the working state.

Specifically, the signaling data for establishing the connection between the wireless terminal and the wireless network side may be request data sent by the wireless terminal to the wireless network side for establishing a DCH link connection. The request data is sent to the wireless network side through a RACH.

The wireless terminal in the embodiment of the present invention focuses on, before the connection between the wireless terminal and the wireless network side is established, whether there is data to be sent to the wireless network side, that is, the request data for establishing the DCH link connection, which is corresponding to a link establish request at a first row of FIG. 3. If the foregoing link establish request exists, the baseband chip of the wireless terminal controls to turn on the PA, after the sending of the link establish request is completed, the baseband chip controls to turn off the PA, thereby effectively reducing the power consumption of the PA and the wireless terminal.

A ninth embodiment of the present invention further provides a data sending device, as compared with the fourth embodiment of the present invention, the difference lies in that, the first unit is configured to, before the connection with the wireless network side is established, detect whether the wireless terminal has data to be sent to the wireless network side, the data including signaling data for establishing the connection between the wireless terminal and the wireless network side.

Specifically, the signaling data for establishing the connection between the wireless terminal and the wireless network side may be request data sent by the wireless terminal to the wireless network side for establishing a DCH link connection. The request data is sent to the wireless network side through a RACH.

The data sending device in the embodiment of the present invention focuses on, before the connection between the wireless terminal and the wireless network side is established, whether there is data to be sent to the wireless network side, that is, the request data for establishing a DCH link connection, which is corresponding to a link establish request at a first row of FIG. 3. If the foregoing link establish request exists, the baseband chip of the wireless terminal controls to turn on the PA, after the sending of the link establish request is completed, the baseband chip controls to turn off the PA, thereby effectively reducing the power consumption of the PA and the wireless terminal.

A tenth embodiment of the present invention further provides a data sending system, and the data sending system includes a wireless terminal and a wireless network side equipment. The wireless terminal is in a communication connection with the wireless network side equipment. The wireless network side equipment may specifically be a base station equipment located in a wireless network side. Therefore, for the specific implementation of the wireless terminal, reference may be made to the implementation of the wireless terminal in the eighth embodiment, and details are not repeated herein.

An eleventh embodiment of the present invention further provides a data sending system, and the data sending system includes a data sending device and a wireless network side equipment. The data sending device is in a communication connection with the wireless network side equipment. The wireless network side equipment may specifically be a base station equipment located in a wireless network side. Therefore, for the specific implementation of the data sending device, reference may be made to the implementation of the data sending device in the ninth embodiment, and details are not repeated herein.

A twelfth embodiment of the present invention further provides a data sending method. The difference between this embodiment and the foregoing first embodiment of the present invention lies in that, in the step 101, after establishing the connection between the wireless terminal and the wireless network side, detect whether the wireless terminal has data to be sent to the wireless network side, the data to be sent including signaling data or user data.

Specifically, the connection between the wireless terminal and the wireless network side is a DCH link connection. The signaling data in the data to be sent is sent to the wireless network side through a dedicated control channel (DCCH), and the user data in the data to be sent is sent to the wireless network side through a dedicated traffic channel (DTCH).

Evidently, in the data sending method of the seventh embodiment and in the data sending method of the second embodiment, the data to be sent to the wireless network side is sent after the connection with the wireless network side is established, that is, sent after the wireless terminal enters an RRC-DCH state.

The data sending method of the embodiment of the present invention focuses on, after the connection with the wireless network side is established, whether there is data to be sent to the wireless network side, including signaling data sent to the wireless network side through a DCCH, which is corresponding to signaling data of a dot-matrix grid at a second row of FIG. 3, and user data sent to the wireless network side through a DTCH, which is corresponding to user data of a diagonal grid at the second row of FIG. 3. If the foregoing signaling data and/or user data exists, the baseband chip of the wireless terminal controls to turn on a PA, after the sending of the signaling data and/or user data is completed, the baseband chip controls to turn off the PA, thereby effectively reducing the power consumption of the PA and the wireless terminal.

A thirteenth embodiment of the present invention further provides a wireless terminal, as compared with the third embodiment of the present invention, the difference lies in that the baseband chip 401 is configured to, after the connection between the wireless terminal and the wireless network side is established, detect whether the baseband chip has data to be sent, the data to be sent including signaling data or user data; if a result of detection is that the baseband chip does not have data to be sent, send, to the PA, the first message of making sure that the PA is in the non-working state; and if the result of detection is that the baseband chip has data to be sent, send to the PA the second message of making sure that the PA is in the working state.

Specifically, the connection between the wireless terminal and the wireless network side is a DCH link connection. The signaling data in the data to be sent is sent to the wireless network side through a DCCH, and the user data in the data to be sent is sent to the wireless network side through a DTCH.

The wireless terminal of the embodiment of the present invention focuses on, after the connection with the wireless network side is established, whether there is data to be sent to the wireless network side, including the signaling data sent to the wireless network side through the DCCH, which is corresponding to signaling data of a dot-matrix grid at a second row of FIG. 3, and the user data sent to the wireless network side through the DTCH, which is corresponding to user data of a diagonal grid at the second row of FIG. 3. If the foregoing signaling data and/or user data exists, the baseband chip of the wireless terminal controls to turn on the PA, after the sending of the signaling data and/or user data is completed, the base-band chip controls to turn off the PA, thereby effectively reducing the power consumption of the PA and the wireless terminal.

A fourteenth embodiment of the present invention further provides a data sending device, compared with the fourth embodiment of the present invention, the difference lies in that the first unit is configured to, after the connection between the wireless terminal and the wireless network side is established, detect whether the wireless terminal has data to be sent to the wireless network side, the data including signaling data or user data.

Specifically, the connection between the wireless terminal and the wireless network side is a DCH link connection. The signaling data in the data to be sent is sent to the wireless network side through a DCCH, and the user data in the data to be sent is sent to the wireless network side through a DTCH.

The data sending device of the embodiment of the present invention focuses on, after the connection with the wireless network side is established, whether there is data to be sent to the wireless network side, including the signaling data sent to the wireless network side through the DCCH, which is corresponding to signaling data of a dot-matrix grid at a second row of FIG. 3, and the user data sent to the wireless network side through the DTCH, which is corresponding to user data of a diagonal grid at the second row of FIG. 3. If the foregoing signaling data and/or user data exists, the baseband chip of the wireless terminal controls to turn on the PA, after the sending of the signaling data and/or user data is completed, the baseband chip controls to turn off the PA, thereby effectively reducing the power consumption of the PA and the wireless terminal.

A fifteenth embodiment of the present invention further provides a data sending system, and the data sending system includes a wireless terminal and a wireless network side equipment. The wireless terminal is in a communication connection with the wireless network side equipment. The wireless network side equipment may specifically be a base station equipment located in a wireless network side. Therefore, for the specific implementation of the wireless terminal, reference may be made to the implementation of the wireless terminal in the thirteenth embodiment, and details are not repeated herein.

A sixteenth embodiment of the present invention further provides a data sending system, and the data sending system includes a data sending device and a wireless network side equipment. The data sending device is in a communication connection with the wireless network side equipment. The wireless network side equipment may specifically be a base station equipment located in a wireless network side. Therefore, for the specific implementation of the data sending device, reference may be made to the implementation of the data sending device in the fourteenth embodiment, and details are not repeated herein.

A seventeenth embodiment of the present invention further provides a computer readable storage medium, the computer stores a computer program code, and when the computer program code is executed by a computer, the computer program code may ensure that the computer executes steps of the method of the first, second, seventh, or twelfth embodiment of the present invention.

An eighteenth embodiment of the present invention further provides a computer program product, the computer program product includes a computer program code, and when the computer program code is executed by a computer, the computer program code may ensure that the computer executes steps of the method of the first, second, seventh, or twelfth embodiment of the present invention.

It is apparent to persons skilled in the art that various modifications and variations can be made to the present invention without departing from the scope and idea of the invention. In view of the above, if the modifications and variations of the present invention fall within the scope of the following claims and their equivalents, the present invention shall cover such modifications and variations.

What is claimed is:

1. A wireless terminal comprising:
a baseband chip;
a power amplifier (PA); and
a transceiver,
wherein the baseband chip is configured to, before a connection with a wireless network side is established, detect whether the baseband chip has data to be sent to the wireless network side,
wherein the data to be sent comprises signaling data for establishing the connection between the wireless terminal and the wireless network side,
wherein a first message indicating that the PA should be in a non-working state is sent to the PA when the baseband chip detects that it does not have data to be sent to the wireless network,
wherein a second message indicating that the PA should be in a working state is sent to the PA when the baseband chip detects that it has data to be sent to the wireless network,
wherein the PA is configured to receive the first message sent by the baseband chip and be ensured that the PA is in the non-working state according to the first message,
wherein the PA is configured to receive the second message sent by the baseband chip and be ensured that the PA is in the working state according to the second message,
wherein the transceiver is configured to receive the data to be sent from the baseband chip, modulate the data to be sent, and send first data after the modulation to the PA,
wherein the PA is further configured to amplify the first data after the modulation, and
wherein the wireless terminal further comprises an antenna configured to send second data amplified by the PA to the wireless network side.

2. The wireless terminal according to claim 1, further comprising an application processor (AP) configured to generate the data to be sent and send the data to be sent to the baseband chip.

3. The wireless terminal according to claim 2, wherein the baseband chip receives the data to be sent from the AP and stores at least one wireless frame in the data to be sent in a first storage, wherein a result corresponding to the detection is that the baseband chip does not have data to be sent when the first storage does not have the data to be sent, wherein a result corresponding to the detection is that the baseband chip has data to be sent when the first storage has at least one wireless frame in the data to be sent, and wherein the wireless terminal further comprises the first storage that is connected to the baseband chip and that is configured to store the at least one wireless frame in the data to be sent.

4. The wireless terminal according to claim 3, wherein the baseband chip stores a part or all of the at least one wireless frame in the first storage in a second storage when the first storage has the at least one wireless frame, wherein a result corresponding to the detection is that the baseband chip does not have data to be sent when the second storage does not have data, wherein a result corresponding to the detection is that the baseband chip has data to be sent when the second storage has data and the data is a part or all of the at least one wireless frame, wherein the wireless terminal further comprises the second storage that is connected to the baseband chip or that is located in the baseband chip, and wherein the second storage is configured to store the data.

5. The wireless terminal according to claim 2, wherein the baseband chip being configured to detect whether the wireless terminal has data to be sent comprises the baseband chip detecting whether a coder of the baseband chip has the data to be sent, and wherein the data to be sent is sent to the baseband chip by the AP.

6. The wireless terminal according to claim 1, wherein the baseband chip is configured to send, to the PA, the first message ensuring that the PA is in the non-working state by sending a first command to a serial peripheral interface (SPI) of the PA through an SPI bus, wherein the first command controls the PA to be in a sleep state.

7. The wireless terminal according to claim 1, wherein the baseband chip is configured to send, to the PA, the first message ensuring that the PA is in the non-working state by sending a second command to a digital radio frequency (digRF) interface of the PA through a digRF bus, wherein the second command controls the PA to be in a sleep state.

8. The wireless terminal according to claim 1, wherein the baseband chip is configured to send, to the PA, the first message ensuring that the PA is in the non-working state by sending a third command to an enable interface (EN) of the PA, wherein the third command controls the PA in a sleep state.

9. The wireless terminal according to claim 1, further comprising a power supplier, wherein the baseband chip is configured to send, to the PA, the first message ensuring that the PA is in the non-working state by instructing the power supplier to stop supplying power for the PA such that the PA is powered off.

* * * * *